US012718210B2

(12) United States Patent
Hirose

(10) Patent No.: US 12,718,210 B2
(45) Date of Patent: Aug. 25, 2026

(54) INFORMATION PROCESSING APPARATUS, INFORMATION PROCESSING METHOD, AND STORAGE MEDIUM

(71) Applicant: Canon Kabushiki Kaisha, Tokyo (JP)

(72) Inventor: Eiko Hirose, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 323 days.

(21) Appl. No.: 18/298,439

(22) Filed: Apr. 11, 2023

(65) Prior Publication Data

US 2023/0334448 A1 Oct. 19, 2023

(30) Foreign Application Priority Data

Apr. 18, 2022 (JP) ................................ 2022-068470

(51) Int. Cl.
*G06Q 20/10* (2012.01)
*G06Q 20/32* (2012.01)

(52) U.S. Cl.
CPC ....... *G06Q 20/102* (2013.01); *G06Q 20/3267* (2020.05)

(58) Field of Classification Search
CPC ............. G06Q 20/102; G06Q 20/3267; G06Q 20/4015; G06Q 20/3224; H04M 1/72457; H04M 1/72463; H04W 4/02
See application file for complete search history.

(56) References Cited

U.S. PATENT DOCUMENTS 10,350,492 B2 * 7/2019 Beppu .................. A63F 13/323
11,201,867 B1 * 12/2021 Jiang .................... H04L 67/306
11,222,040 B2 * 1/2022 Beppu ..................... A63F 13/92
11,823,166 B2 * 11/2023 Giraudo ............ G06Q 30/0639
2013/0165157 A1 * 6/2013 Mapes .................. G06Q 10/10 455/456.5
2017/0083979 A1 * 3/2017 Winn .................. G06Q 20/102
2018/0147486 A1 * 5/2018 Beppu ..................... A63F 13/79
2021/0385611 A1 * 12/2021 Takahara ............. H04W 4/025

FOREIGN PATENT DOCUMENTS

CN 104657856 A 5/2015
CN 107209884 A 9/2017
CN 107424039 A 12/2017

(Continued)

OTHER PUBLICATIONS

Japanese Office Action dated Apr. 24, 2026 in counterpart Japanese Patent Appln. No. 2022-068470.

(Continued)

*Primary Examiner* — Michael Jared Walker
(74) *Attorney, Agent, or Firm* — Venable LLP

(57) ABSTRACT

There is provided an information processing apparatus. A request unit requests a specific server among a plurality of servers to execute predetermined processing, the specific server being associated with specific locale information that is currently set. A storage unit stores server identification information that identifies the specific server associated with the specific locale information. An obtainment unit identifies the specific server based on the server identification information, and obtains predetermined information derived from the predetermined processing from the specific server that has been identified.

13 Claims, 6 Drawing Sheets

(56) References Cited

FOREIGN PATENT DOCUMENTS

| | | | |
|---|---|---|---|
| CN | 109905446 | A | 6/2019 |
| CN | 110659890 | A | 1/2020 |
| CN | 111199401 | A | 5/2020 |
| JP | 2005050253 | A | 2/2005 |
| JP | 2008066984 | A | 3/2008 |
| JP | 2013196506 | A | 9/2013 |
| JP | 2021120836 | A | 8/2021 |

OTHER PUBLICATIONS

Chinese Office Action dated Jun. 9, 2026 in counterpart Chinese Patent Appln. No. 202310410572.6, with English translation.

* cited by examiner

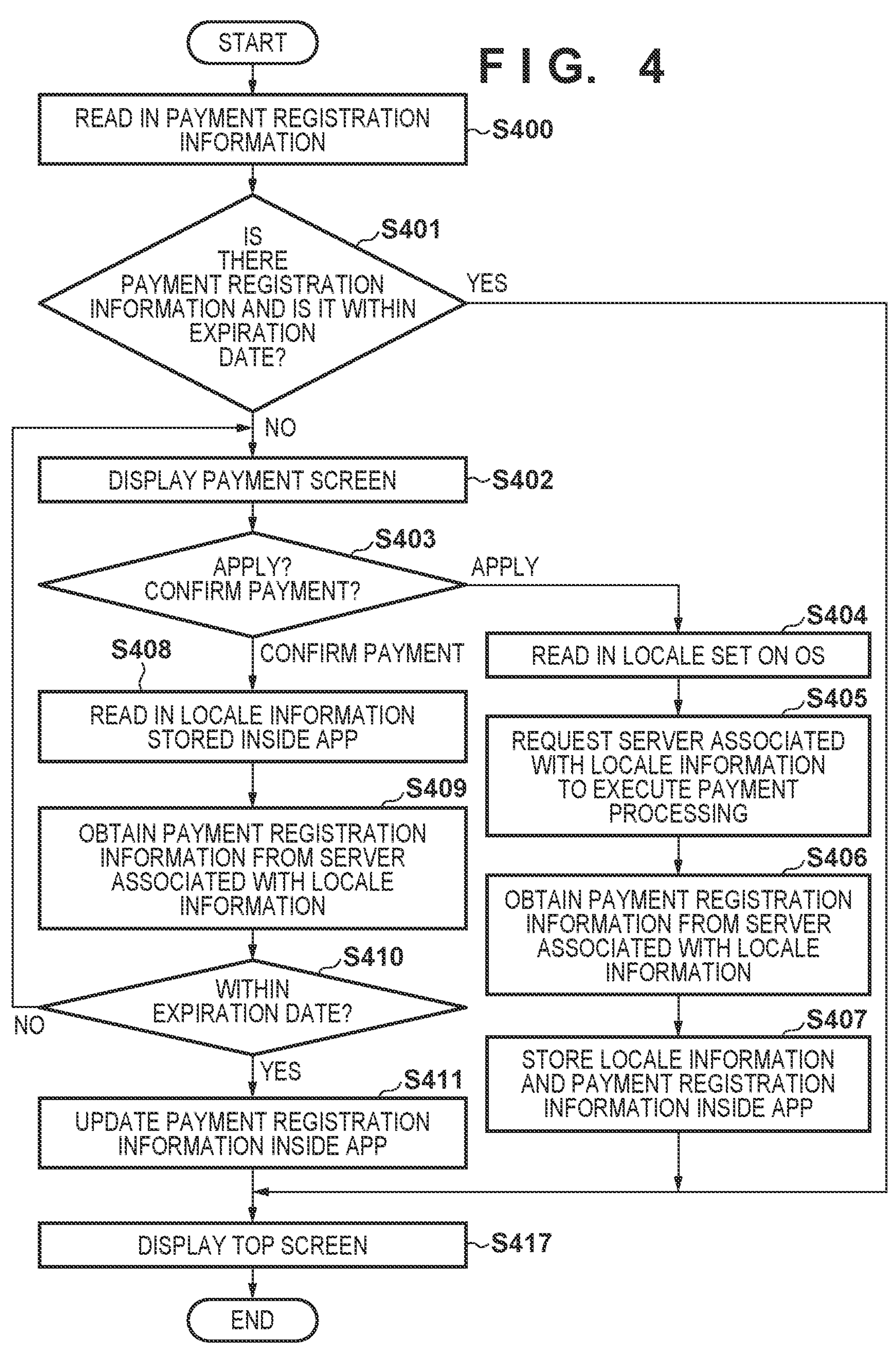
FIG. 4
START
READ IN PAYMENT REGISTRATION INFORMATION
S400
IS THERE PAYMENT REGISTRATION INFORMATION AND IS IT WITHIN EXPIRATION DATE?
S401
YES
NO
DISPLAY PAYMENT SCREEN
S402
APPLY? CONFIRM PAYMENT?
S403
APPLY
CONFIRM PAYMENT
S408
READ IN LOCALE INFORMATION STORED INSIDE APP
S409
OBTAIN PAYMENT REGISTRATION INFORMATION FROM SERVER ASSOCIATED WITH LOCALE INFORMATION
S410
WITHIN EXPIRATION DATE?
NO
YES
S411
UPDATE PAYMENT REGISTRATION INFORMATION INSIDE APP
S404
READ IN LOCALE SET ON OS
S405
REQUEST SERVER ASSOCIATED WITH LOCALE INFORMATION TO EXECUTE PAYMENT PROCESSING
S406
OBTAIN PAYMENT REGISTRATION INFORMATION FROM SERVER ASSOCIATED WITH LOCALE INFORMATION
S407
STORE LOCALE INFORMATION AND PAYMENT REGISTRATION INFORMATION INSIDE APP
DISPLAY TOP SCREEN
S417
END

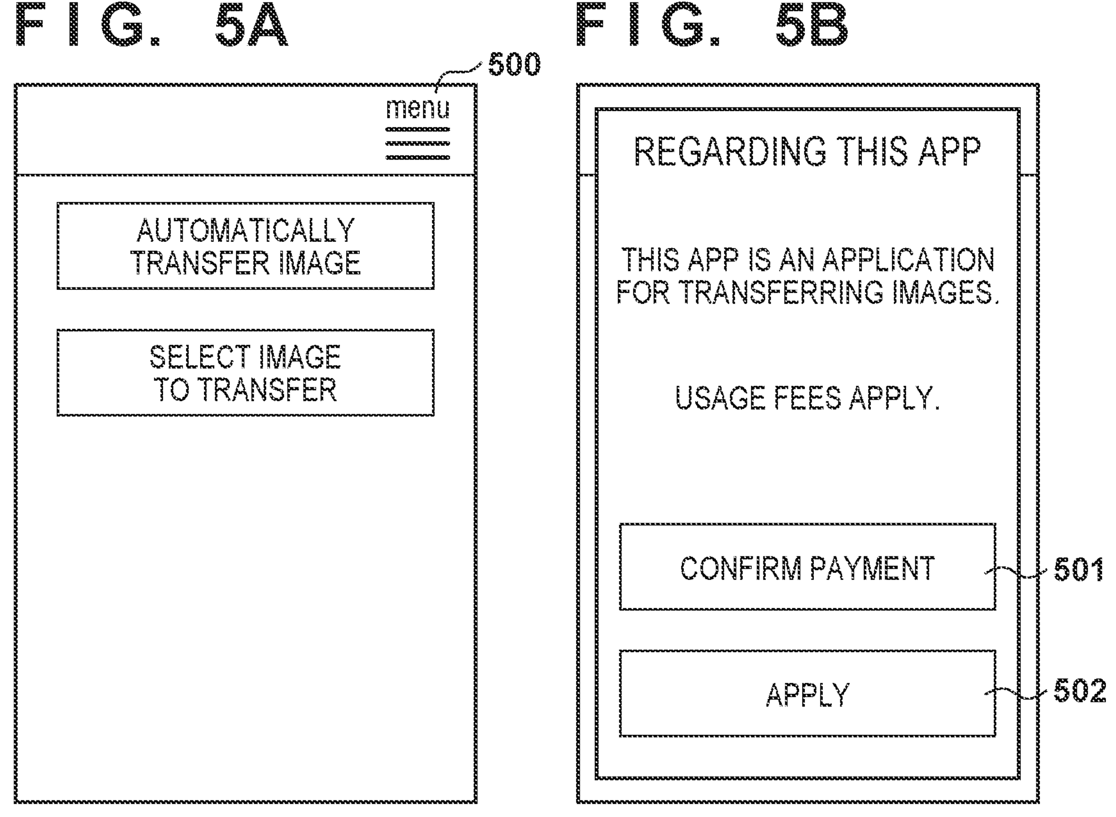
FIG. 5A
500
menu
AUTOMATICALLY TRANSFER IMAGE
SELECT IMAGE TO TRANSFER
FIG. 5B
REGARDING THIS APP
THIS APP IS AN APPLICATION FOR TRANSFERRING IMAGES.
USAGE FEES APPLY.
CONFIRM PAYMENT
501
APPLY
502
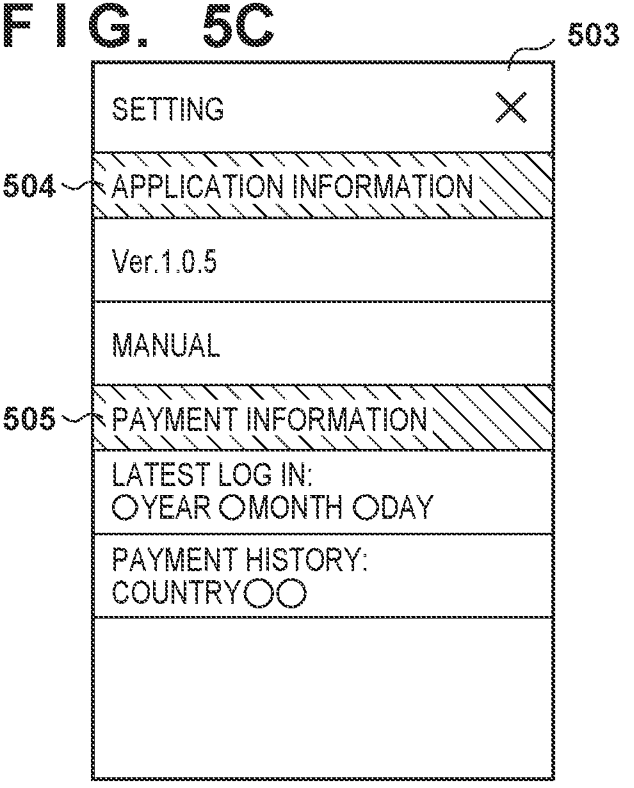
FIG. 5C
503
SETTING
504
APPLICATION INFORMATION
Ver.1.0.5
MANUAL
505
PAYMENT INFORMATION
LATEST LOG IN:
○YEAR ○MONTH ○DAY
PAYMENT HISTORY:
COUNTRY○○

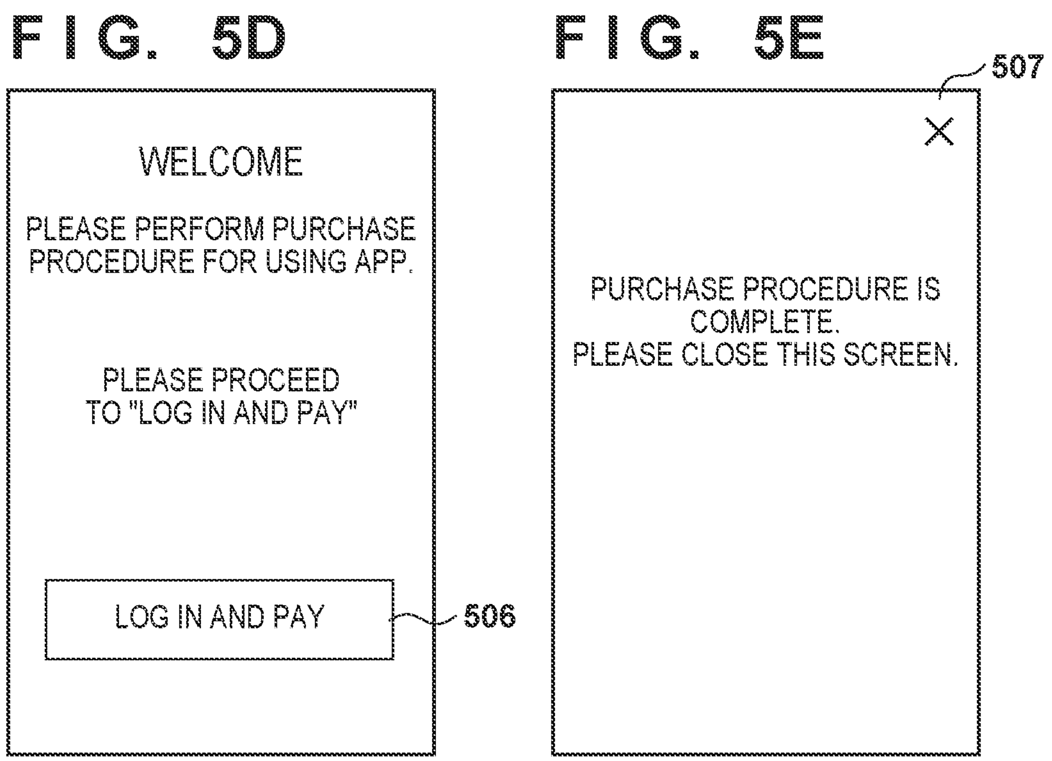
FIG. 5D
WELCOME
PLEASE PERFORM PURCHASE PROCEDURE FOR USING APP.
PLEASE PROCEED TO "LOG IN AND PAY"
LOG IN AND PAY
506
FIG. 5E
507
PURCHASE PROCEDURE IS COMPLETE.
PLEASE CLOSE THIS SCREEN.
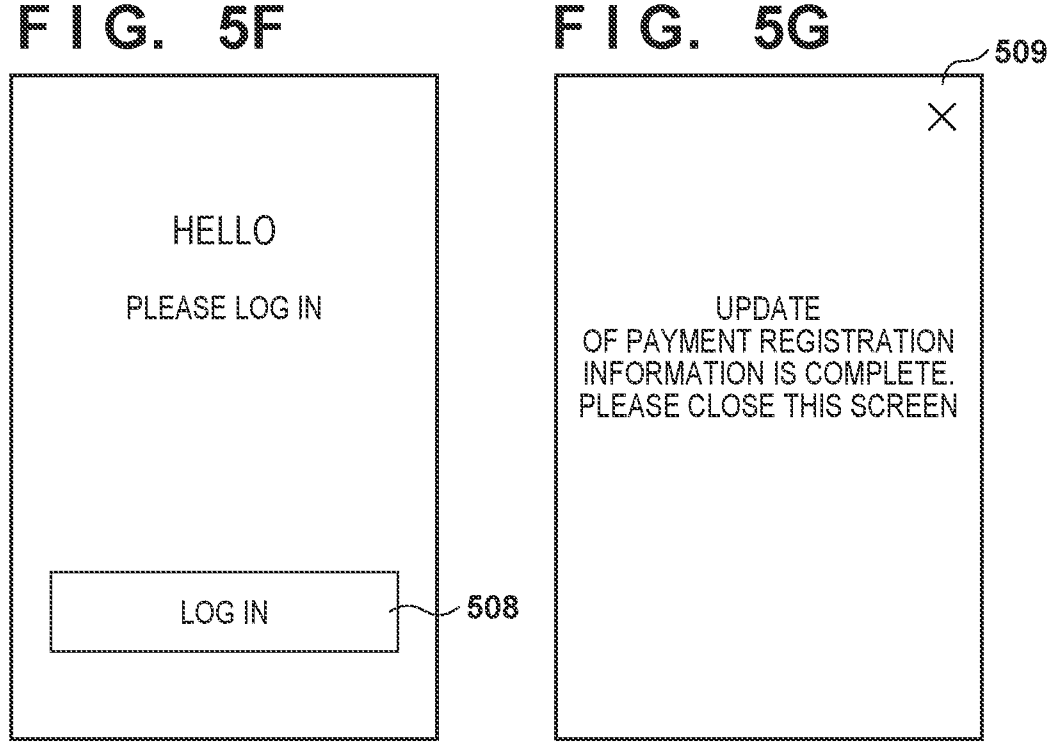
FIG. 5F
HELLO
PLEASE LOG IN
LOG IN
508
FIG. 5G
509
UPDATE OF PAYMENT REGISTRATION INFORMATION IS COMPLETE.
PLEASE CLOSE THIS SCREEN

INFORMATION PROCESSING APPARATUS, INFORMATION PROCESSING METHOD, AND STORAGE MEDIUM

BACKGROUND OF THE INVENTION

Field of the Invention

The present invention relates to an information processing apparatus, an information processing method, and a storage medium.

Description of the Related Art

On some information processing apparatuses, such as smartphones, information of the language and the place of residence of a user can be set as locale information. For example, the locale information is used to select a resource to be read in by an application when the user executes the application. Also, the behavior of the application can be controlled based on the locale information; for example, menu items and the contents of messages to be displayed on the application are switched in accordance with the locale information. In general, the user can set the locale information using, for example, a setting menu that is displayed at the time of the first activation of an information processing apparatus. Furthermore, the user can also change the locale information at a later time.

Japanese Patent Laid-Open No. 2013-196506 discloses a method where, in a system in which the contents input by an applicant on an application screen are confirmed and approved by an approver on an approval screen, input items displayed on the application screen and the approval screen are controlled based on respective locale information pieces of the applicant and the approver.

There is a case where an information processing apparatus cannot execute appropriate operations when locale information has been changed, depending on the intended use of the locale information. One example of the intended use that has the possibility of causing this situation is a selection of a payment management server, that executes processing for payment of a usage fee of an application and manages a payment status, based on locale information.

For example, assume a case where a user causes a smartphone to access a payment management server and execute payment processing in order to use a paid application that operates on the smartphone. It is assumed that the payment management server to be accessed in this case varies depending on the place of residence of the user. The smartphone accesses an appropriate payment management server and executes payment processing based on locale information that is currently set on an OS. Assume a case where the user changes the locale information thereafter, and the user attempts to access the payment management server again to confirm a payment status after changing the locale information. If the locale information pieces before and after the change are associated with different payment management servers, the payment management server that is accessed by the smartphone based on the locale information is different from the payment management server that executed the payment processing, and therefore does not manage the payment status. As a result, the smartphone cannot obtain information related to the payment status, and the user cannot confirm the payment status.

SUMMARY OF THE INVENTION

The present invention has been made in view of the foregoing situation. The present invention provides a technique to reduce the possibility of causing problems attributed to a change in locale information in a configuration that allows the locale information to be changed after requesting the execution of predetermined processing (e.g., payment processing) to a server associated with the locale information that is currently set.

According to a first aspect of the present invention, there is provided an information processing apparatus, comprising: a request unit configured to request a specific server among a plurality of servers to execute predetermined processing, the specific server being associated with specific locale information that is currently set; a storage unit configured to store server identification information that identifies the specific server associated with the specific locale information; and an obtainment unit configured to identify the specific server based on the server identification information, and obtain predetermined information derived from the predetermined processing from the specific server that has been identified.

According to a second aspect of the present invention, there is provided an information processing method executed by an information processing apparatus, comprising: requesting a specific server among a plurality of servers to execute predetermined processing, the specific server being associated with specific locale information that is currently set; storing server identification information that identifies the specific server associated with the specific locale information; and identifying the specific server based on the server identification information, and obtaining predetermined information derived from the predetermined processing from the specific server that has been identified.

According to a third aspect of the present invention, there is provided a non-transitory computer-readable storage medium which stores a program for causing a computer to execute an information processing method comprising: requesting a specific server among a plurality of servers to execute predetermined processing, the specific server being associated with specific locale information that is currently set; storing server identification information that identifies the specific server associated with the specific locale information; and identifying the specific server based on the server identification information, and obtaining predetermined information derived from the predetermined processing from the specific server that has been identified.

According to a fourth aspect of the present invention, there is provided a non-transitory computer-readable storage medium which stores a program as an application that operates on an operating system (OS), wherein the program, when executed by a processor of an information processing apparatus, causes the processor to perform: obtaining specific locale information that is currently set on the OS; requesting a specific server among a plurality of servers to execute predetermined processing, the specific server being associated with the specific locale information; storing server identification information that identifies the specific server associated with the specific locale information; and identifying the specific server based on the server identification information, and obtaining predetermined information derived from the predetermined processing from the specific server that has been identified.

Further features of the present invention will become apparent from the following description of exemplary embodiments with reference to the attached drawings.

BRIEF DESCRIPTION OF THE DRAWINGS

FIG. 4 is a flowchart of payment management processing.

FIGS. 5A to 5G are diagrams showing display examples of a user interface of an image transfer application.

DESCRIPTION OF THE EMBODIMENTS

Figure 1:
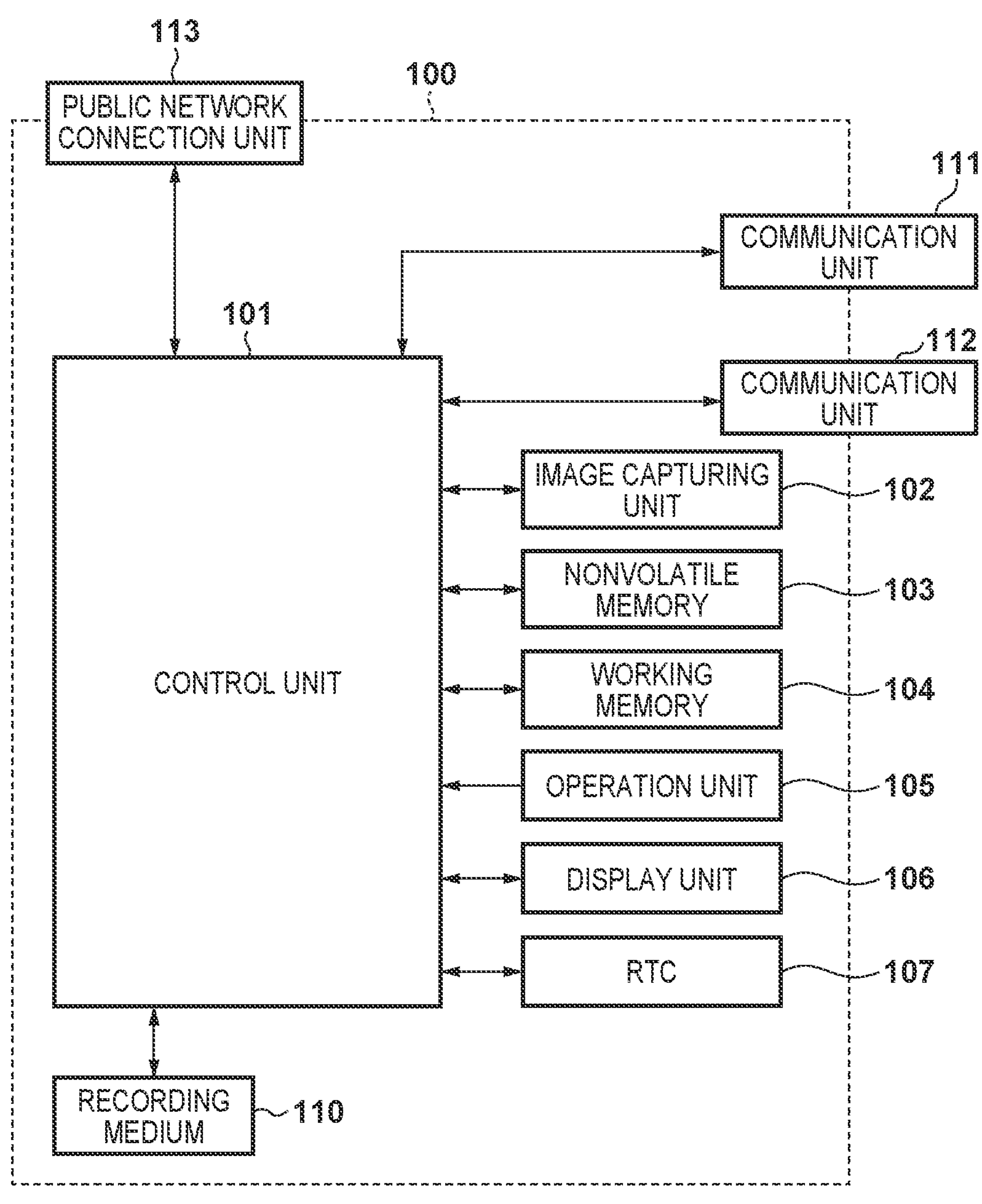
FIG. 1 is a block diagram showing a configuration of a smartphone 100.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

<Internal Configuration of Smartphone 100>

FIG. 1 is a block diagram showing a configuration of a smartphone 100, which is one example of an information processing apparatus. Note that although a smartphone is described here as one example of an information processing apparatus, an information processing apparatus of the present embodiment is not limited to this. For example, an information processing apparatus may be a digital camera, a tablet device, a personal computer, or the like with a communication function.

A control unit 101 controls each unit of the smartphone 100 in accordance with an input signal and a later-described program. Note that the entirety of the apparatus may be controlled by a plurality of items of hardware sharing processing, instead of the control unit 101 controlling the entirety of the apparatus.

An image capturing unit 102 is composed of, for example, an optical system that controls an optical lens unit, a diaphragm, zooming, focusing, and the like, an image sensor for converting light that has been introduced via the optical lens unit (video) into an electrical video signal, and so forth. A Complementary Metal Oxide Semiconductor (CMOS) or a Charge Coupled Device (CCD) is typically used as the image sensor. Under control of the control unit 101, the image capturing unit 102 converts subject light that has been formed as an image by a lens included in the image capturing unit 102 into an electrical signal via the image sensor, executes noise reduction processing and the like, and outputs digital data as image data. In the smartphone 100 of the present embodiment, the image data is recorded into a recording medium 110 in conformity with the standard of Design Rule for Camera File System (DCF).

A nonvolatile memory 103 is a nonvolatile memory that is electrically erasable and recordable. Recorded in the nonvolatile memory 103 are an OS (operating system), which is basic software executed by the control unit 101, and an application that realizes applied functions in coordination with this OS. Furthermore, an image transfer application, which is described in the present embodiment, is stored in the nonvolatile memory 103.

A working memory 104 is used as an image display memory for a display unit 106, a working area for the control unit 101, and so forth.

An operation unit 105 is used to accept an instruction to the smartphone 100 from a user. The operation unit 105 includes, for example, such operation members as a power button that is used by the user to instruct the smartphone 100 to turn ON/OFF its power, an operation member for setting an RTC 107, and a touch panel formed in the display unit 106.

The display unit 106 displays image data, characters for interactive operations, and so forth. Note that the display unit 106 need not necessarily be included in the smartphone 100. It is sufficient that the smartphone 100 be capable of connecting to the display unit 106, and include at least a display control function for controlling display on the display unit 106.

The RTC 107 manages clocks. The user can set time via the operation unit 105. Furthermore, it is permissible to adopt a configuration in which the RTC 107 obtains time information via a communication unit 111 and sets time, or adopt clock settings acquired by a radio clock. As long as time can be managed, a specific management method is not limited in particular. Furthermore, it is permissible to adopt a configuration in which a detection mechanism included in the RTC 107 obtains time from a mechanical mechanism, such as an analog clock.

Various types of data, such as image data, are recorded in the recording medium 110. The recording medium 110 may be configured to be attachable to and detachable from the smartphone 100, or may be built in the smartphone 100. That is to say, it is sufficient that the smartphone 100 be configured to at least access the recording medium 110.

The communication unit 111 is an interface for connecting to an external apparatus. The smartphone 100 of the present embodiment can exchange data with the external apparatus via the communication unit 111. Note that in the present embodiment, the communication unit 111 includes an interface for communicating with the external apparatus in conformity with the standard of IEEE 802.11, which is a so-called wireless LAN. The control unit 101 realizes wireless communication with the external apparatus by controlling the communication unit 111. Note that a communication method is not limited to the wireless LAN, and also includes, for example, an infrared communication method.

A communication unit 112 is an interface for connecting to an external apparatus. The smartphone 100 of the present embodiment can exchange data with the external apparatus via the communication unit 112. Note that in the present embodiment, the communication unit 112 includes an interface for communicating with the external apparatus in conformity with the standard of IEEE 802.15.1, which is so-called Bluetooth®. The control unit 101 realizes wireless communication with the external apparatus by controlling the communication unit 112. Note that a communication method is not limited to Bluetooth, and also includes, for example, a wireless LAN, which is known as the standard of IEEE 802.11, or an infrared communication method.

A public network connection unit 113 is an interface that is used when performing public wireless communication. The smartphone 100 can make/receive a telephone call to/from another device, and perform data communication therewith, via the public network connection unit 113. In the present embodiment, it is assumed that the public network connection unit 113 includes an interface for performing communication using 5G. Note that a communication method is not limited to 5G, and other communication methods, such as LTE, WiMAX, ADSL, FTTH, and so-called 4G, may be used. Furthermore, each of the communication unit 111, the communication unit 112, and the public network connection unit 113 need not necessarily be composed of independent hardware. For example, the communication unit 111, the communication unit 112, and the public network connection unit 113 may share one antenna.

<Internal Configuration of Payment Management Server 200>

Figure 2:
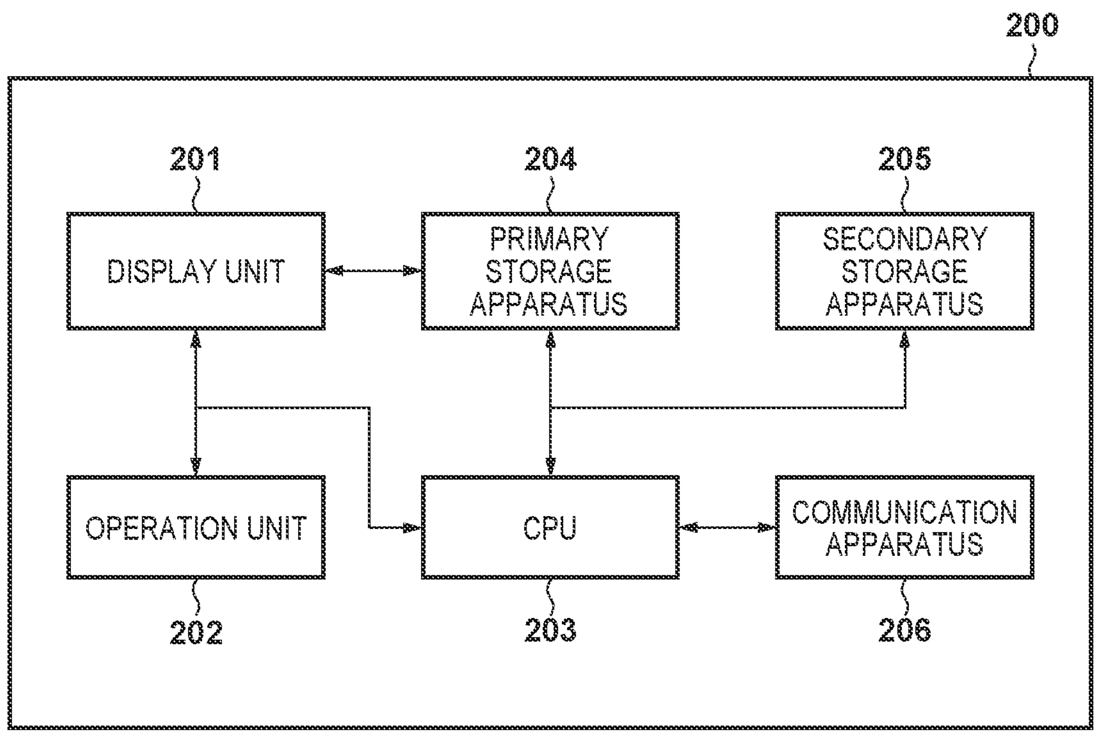
FIG. 2 is a block diagram showing a configuration of a payment management server 200.

FIG. 2 is a block diagram showing a configuration of a payment management server 200. The payment management server 200 includes a display unit 201, an operation unit 202, a CPU 203, a primary storage apparatus 204, a secondary storage apparatus 205, and a communication apparatus 206. A display apparatus, such as an LCD, is used as the display unit 201. Note that the display unit 201 need not be included in the payment management server 200, and it is sufficient that the payment management server 200 include a display control function for controlling display on the display unit 201. A keyboard, a mouse, a touch panel, and the like can be used as the operation unit 202. The primary storage apparatus 204 is a memory (e.g., a DRAM or an SRAM), and is used as a buffer memory that temporarily holds data, a working area for the CPU 203, and the like. The secondary storage apparatus 205 is an external storage medium, such as a hard disk drive, an optical disc (e.g., a DVD-RW, a CD-ROM, a CD-R, or a DVD-RAM), a flexible disk, a magnetic disc (e.g., an MO), and a nonvolatile memory (e.g., a flash memory). The CPU 203 controls the payment management server 200 in accordance with a control program stored in the primary storage apparatus 204 and the secondary storage apparatus 205. The communication apparatus 206 is an interface for connecting to an external apparatus. The payment management server 200 can transmit/receive data to/from the external apparatus using the communication apparatus 206.

<Configuration of Payment Management System, and Overview of Payment Management Processing>

Figure 3:
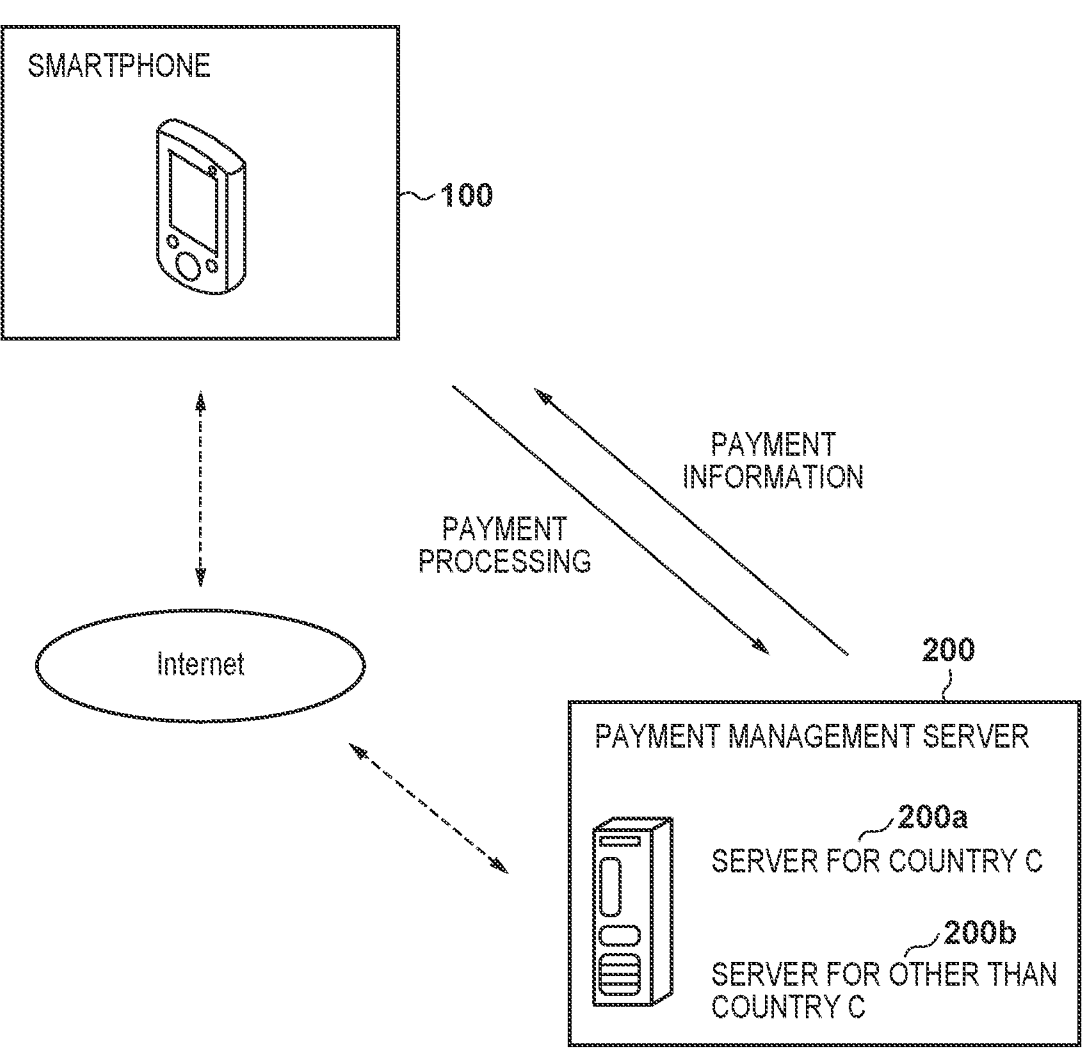
FIG. 3 is a diagram showing a configuration of a payment management system.

The following describes a configuration of a payment management system and an overview of payment management processing according to the present embodiment with reference to FIG. 3. The payment management system includes a smartphone 100 and a payment management server 200. Each of the smartphone 100 and the payment management server 200 has a communication function, and is capable of connecting to the Internet. In the payment management system of the present embodiment, different payment management servers 200 are used depending on the place of residence of a user.

Hereinafter, it is assumed that a server 200*a* for country C and a server 200*b* for other than country C are used as payment management servers 200, as an example for explanation. In a case where the place of residence of the user is country C, the server 200*a* for country C is used; in a case where the place of residence of the user is other than country C, the server 200*b* for other than country C is used. In this way, a plurality of countries (countries other than country C) may be associated with the same server (the server 200*b* for other than country C). As will be described later, the place of residence of the user is determined based on locale information set on an OS of the smartphone 100. Note that the number of payment management servers 200 in the payment management system is not limited to two, and three or more servers may be used.

The user installs an image transfer application (hereinafter referred to as an "app") according to the present embodiment on the smartphone 100 by operating the smartphone 100. In order for the user to start using the app, the user needs to apply for the use and pay a usage fee of the app. Hereinafter, it is assumed that upon making an application for the use of the app, a subscription contract with an automatically-updated expiration date is started, as an example for explanation.

Once the user has activated the app by operating the smartphone 100, the user is prompted to access the payment management server 200 to apply for the use of the app. The user accesses the payment management server 200 and pays the usage fee of the app. Consequently, the subscription contract for using the app is started. Based on the subscription contract, the usage fee occurs on a monthly basis. The payment management server 200 that is accessed by the smartphone 100 varies depending on the place of residence of the user. Although it is technically possible to adopt a configuration that allows the user to select which one of the server 200*a* for country C and the server 200*b* for other than country C to be accessed, the app according to the present embodiment switches between servers to be accessed in accordance with the locale information of the smartphone 100. At the time of application for the use of the app, the smartphone 100 reads in the locale information that is currently set on the OS. The smartphone 100 executes processing so as to access the server 200*a* for country C in a case where the locale information indicates country C, and access the server 200*b* for other than country C otherwise. In this way, the number of steps of a user operation can be reduced, and convenience can be improved.

When the user has completed payment processing, the app installed on the smartphone 100 is placed in a usable state. The smartphone 100 stores, inside the app, payment registration information of the user. In addition, the smartphone 100 stores, inside the app, the locale information that is set on the OS at the time of completion of the payment processing. The payment registration information mentioned here includes a date of payment, and an expiration date for use calculated therefrom (the latest expiration date of the subscription contract). For example, in a case where the payment has been made on March $1^{st}$, the expiration date is March $31^{th}$. However, as the payment registration information can be any entity as long as it is information that allows whether the user can use the app to be determined, the payment registration information is not limited to the foregoing example.

From then on, when the user activates the app by operating the smartphone 100, the smartphone 100 simply causes the app to operate in a case where the payment registration information stored inside the app is within the expiration date. In a case where the payment registration information stored inside the app has exceeded the expiration date, the smartphone 100 accesses the payment management server 200 and confirms the payment status of the user. At the time of confirmation of the payment status, the smartphone 100 reads in the locale information stored inside the app. The smartphone 100 executes processing so as to access the server 200*a* for country C in a case where the stored locale information indicates country C, and access the server 200*b* for other than country C otherwise. Once the smartphone 100 has accessed the payment management server 200 (the server 200*a* for country C or the server 200*b* for other than country C) and confirmed the payment, the app is placed in a usable state. The smartphone 100 obtains the latest expiration date of the subscription contract from the payment management server 200, and updates the payment registration information stored inside the app based on the obtained expiration date. For example, the expiration date before the update is March $31^{st}$, and the expiration date after the update is April $30^{th}$.

In the present embodiment, the payment registration information and the locale information stored inside the app are stored as a part of user settings inside the app. The user settings are, for example, data indicating a sort order, a display format, and the like of images, that is to say, data that is read in and used when the smartphone 100 causes the app to operate. While the user settings are stored in an app-specific file area assigned by the OS, they cannot be confirmed from a normal user environment.

The smartphone 100 stores the locale information set on the OS, which has been read in when the user executed the payment processing, inside the app as a user setting. The locale information set on the OS can be optionally changed by the user through the OS functions, even after the user completed the payment processing. For example, the smartphone 100 displays a setting screen for the locale information on the display unit 106 in accordance with a user instruction via the operation unit 105. The user selects locale information that is different from the current locale information by operating the operation unit 105. The smartphone 100 changes the locale information set on the OS to the locale information selected by the user.

On the other hand, the locale information stored inside the app is not changed even if the locale information on the OS has been changed. This is because of the following reason: in the present embodiment, while the smartphone 100 accesses a server corresponding to locale information at the time of application for the use of the app and at the time of confirmation of the payment status, the payment status can be confirmed only with a server on which processing for an application for the use of the app has been executed.

For example, with regard to user A, in a case where locale information set on the OS indicates country C at the time of application for the use of the app, user A executes the payment processing on the server 200*a* for country C. In this case, the payment status is managed by the server 200*a* for country C. A smartphone 100 of user A stores payment registration information and locale information (country C) inside the app. When the payment registration information exceeds the expiration date thereafter, the smartphone 100 of user A reads in the locale information (country C) stored inside the app and accesses the server 200*a* for country C; therefore, the payment status can be confirmed appropriately.

Here, assume a case where user A has changed the locale information on the OS to indicate other than country C after the payment processing. Should the smartphone 100 update the locale information inside the app to the changed locale information (other than country C) on the OS, the smartphone 100 of user A accesses the server 200*b* for other than country C in a case where the payment registration information has exceeded the expiration date. As information related to the payment status of user A does not exist in the server 200*b* for other than country C, it is determined that the usage fee has not been paid, thereby disabling user A from using the app.

Therefore, in the present embodiment, once the locale information has been stored inside the app, the smartphone 100 does not update the locale information stored inside the app, even if the locale information on the OS has been changed. Furthermore, for a similar reason, when accessing the payment management server 200 after the payment registration information has exceeded the expiration date, the smartphone 100 reads in the locale information that has been stored inside the app as a user setting, rather than the locale information set on the OS.

<Details of Payment Management Processing>

The following describes the details of the payment management processing in the payment management system according to the present embodiment with reference to FIG. 4 and FIGS. 5A to 5G. FIG. 4 is a flowchart of the payment management processing, and FIGS. 5A to 5G are diagrams showing display examples of a user interface of the app. When the user taps an icon of the installed app by operating the smartphone 100, the smartphone 100 activates the app stored in the nonvolatile memory 103. Once the app has been activated, processing of the flowchart shown in FIG. 4 is started. In the present flowchart, processing and operations that are described as being executed by the control unit 101 of the smartphone 100 are realized by the control unit 101 (e.g., a processor) of the smartphone 100 executing a program for the app on the OS, unless specifically stated otherwise.

In step S400, the control unit 101 reads in the payment registration information stored inside the app. In step S401, the control unit 101 determines whether the payment registration information exists. The control unit 101 determines that the payment registration information exists in a case where reading of the payment registration information in step S400 succeeded, and determines that the payment registration information does not exist in a case where reading of the payment registration information in step S400 failed. Furthermore, in a case where the payment registration information exists, the control unit 101 determines whether the payment registration information is within the expiration date. In a case where it has been determined that the payment registration information exists and it is within the expiration date, the processing step proceeds to step S417; otherwise (in a case where the payment registration information does not exist, or in a case where the payment registration information exists but is not within the expiration date), the processing step proceeds to step S402.

In step S402, the control unit 101 displays a payment screen of the app, which is shown in the display example of FIG. 5B, on the display unit 106. The payment screen of the app includes a "confirm payment" button 501 and an "apply" button 502.

In step S403, the control unit 101 determines which button has been selected by the user on the payment screen of the app. In a case where it has been determined that the "apply" button 502 has been selected, the processing step proceeds to step S404; in a case where it has been determined that the "confirm payment" button 501 has been selected, the processing step proceeds to step S408.

Note that it is permissible to adopt a configuration in which the processing step bifurcates into step S404 or step S408 in accordance with whether the payment registration information exists, instead of causing the user to select a button. In this case, processing of step S402 can be skipped. In a case where the control unit 101 has determined that the payment registration information does not exist, the processing step proceeds to step S404; in a case where it has determined that the payment registration information exists (in this case, the payment registration information has exceeded the expiration date), the processing step proceeds to step S408.

In step S404, the control unit 101 reads in (obtains) the locale information that is currently set on the OS. In step S405, the control unit 101 requests the payment management server 200 associated with the locale information that has been read in in step S404 to execute the payment processing. The payment management server 200 associated with the locale information indicating country C is the server 200*a* for country C. The payment management server 200 associated with the locale information indicating countries other than country C is the server 200*b* for other than country C. In order to request the execution of the payment processing, the control unit 101 accesses the payment management server 200, and displays a screen shown in the display example of FIG. 5D on the display unit 106. The user presses a "log in and pay" button 506 by operating the smartphone 100. When the "log in and pay" button 506 has been pressed, the control unit 101 logs into the payment management server 200 and makes a request for the execution of the payment processing. This request includes information indicating a payment method (e.g., a credit card number). When the payment management server 200 has completed the payment processing, a subscription contract is started. The smartphone 100 displays a purchase completion screen shown in the display example of FIG. 5E on the display unit 106. When the user has pressed a "close" button 507 by operating the smartphone 100, the control unit 101 closes the purchase completion screen shown in FIG. 5E.

In step S406, the control unit 101 obtains the payment registration information including information indicating the latest expiration date of the subscription contract from the payment management server 200 associated with the locale information that has been read in in step S404. In step S407, the control unit 101 stores the locale information that has been read in in step S404, as well as the payment registration information that has been obtained in step S406, inside the app. Note that processing of steps S406 and S407 may be executed before or during the display of the purchase completion screen shown in FIG. 5E.

Note that although no specific restriction is placed on a method of associating the locale information and the payment management server 200 with each other, it is permissible to adopt, for example, a method whereby a table for defining the association is included in data that composes the app. In this case, the control unit 101 can identify the payment management server 200 corresponding to the country indicated by the locale information with reference to the table.

In a case where the processing step proceeds from step S403 to step S408, the control unit 101 reads in the locale information stored inside the app. The locale information stored inside the app is the locale information that has been read in in the aforementioned step S404 and has been stored in the aforementioned step S407 (i.e., the locale information that has been set on the OS when the payment management server 200 has been requested to execute the payment processing).

Note that, for example, in a case where a problem has occurred due to a failure and the like in the smartphone 100, or in a case where the app has been reinstalled after being uninstalled, there is a possibility that the locale information stored inside the app is deleted. In this case, the control unit 101 cannot read in the locale information stored in the app in step S408. In this case, the control unit 101 reads in the locale information that is currently set on the OS. However, in a case where the locale information on the OS has been changed after the payment processing and the locale information pieces before and after the change are associated with different payment management servers 200, the obtainment of the payment registration information in the next step S409 is not carried out accurately.

In step S409, the control unit 101 obtains the payment registration information including information indicating the latest expiration date of the subscription contract from the payment management server 200 associated with the locale information that has been read in in step S408. In a case where the locale information indicates country C, the payment management server 200 associated with the locale information is the server 200*a* for country C. In a case where the locale information indicates other than country C, the payment management server 200 associated with the locale information is the server 200*b* for other than country C. In order to obtain the payment registration information, the control unit 101 accesses the payment management server 200, and displays a screen shown in the display example of FIG. 5F on the display unit 106. When the user has pressed a "log in" button 508 by operating the smartphone 100, the control unit 101 executes login processing with respect to the payment management server 200, and obtains the payment registration information.

In step S410, the control unit 101 determines whether the payment registration information obtained in step S409 is within the expiration date. In a case where it has been determined that the payment registration information is within the expiration date, the processing step proceeds to step S411; in a case where it has been determined that the payment registration information is not within the expiration date, the processing step returns to step S402.

For example, assume a case where the expiration date included in the payment registration information obtained in step S406 is March 31$^{st}$. In this case, the subscription contract is automatically updated if the payment method designated in step S404 is valid (e.g., if a credit card has not been disabled) at a preset timing before or after the expiration date passes. The updated expiration date is, for example, April 30$^{th}$. However, simply updating the expiration date managed by the payment management server 200 does not update the expiration date of the payment registration information stored in the app. Therefore, for example, if the app is activated on April 1$^{st}$, the control unit 101 detects that the expiration date of the payment registration information stored in the app (the latest expiration date that has already been obtained) has passed through processing of step S401. The expiration date of the payment registration information obtained in step S409 is the latest (updated) expiration date managed by the payment management server 200, namely April 30$^{th}$. Therefore, in step S410, it is determined that the payment registration information obtained in step S409 is within the expiration date.

In step S411, the control unit 101 updates the payment registration information inside the app by replacing the payment registration information stored inside the app with the payment registration information obtained in step S409. Furthermore, the control unit 101 displays an update completion screen shown in the display example of FIG. 5G on the display unit 106. When the user has pressed a "close" button 509 by operating the smartphone 100, the control unit 101 closes the update completion screen shown in the display example of FIG. 5G.

Note that as stated earlier, in a case where the locale information stored inside the app has been deleted for some reason, the locale information that is currently set on the OS is read in in step S408. In this case, in step S411, the control unit 101 stores the locale information that has been read in in step S408, in addition to the payment registration information, inside the app.

In step S417, the control unit 101 displays a top screen shown in the display example of FIG. 5A on the display unit 106. The top screen includes a "menu" button 500. When the user has pressed the "menu" button 500, the control unit 101 displays a setting screen of the app shown in the display example of FIG. 5C on the display unit 106. The setting screen of the app includes payment information 505, and the payment information 505 includes locale information stored inside the app. When the user has pressed a "close" button 503 on the setting screen, the setting screen is closed, and the top screen is displayed again.

Information displayed on the setting screen of the app is the locale information stored inside the app, and is not the locale information that is currently set on the OS. Even if the locale information set on the OS has been changed to information different from the locale information stored inside the app, the control unit 101 references the locale information stored inside the app and displays the same on the setting screen. Application information 504 and the payment information 505 in the display example of FIG. 5C are expected to be, for example, used when the user makes an inquiry to a support center. Therefore, a display format of the application information 504 and the payment information 505 may be any format as long as it is a format that is easily understood by the user. As described above, if the user can confirm information of a payment recipient (the locale information that has been set on the OS at the time of the execution of the payment processing), there is an advantage that the information can be used in making an inquiry, and therefore the locale information stored inside the app is displayed on the setting screen of the app; however, in a case where there is no need for the user to confirm the same, it is not necessary to display the locale information. For example, regarding the language of character strings displayed on the app, the control unit 101 reads in the locale information set on the OS at the time of activation of the app, and changes the language in accordance with the locale information. If the locale information on the OS has been changed by a user operation, the control unit 101 changes the language of character strings displayed on the app in accordance with the changed locale information. However, as the language in which character strings are displayed is obvious to the user, it is not beneficial to display the locale information that is currently set on the OS on the setting screen of the app as information of language display. For this reason, the locale information that is currently set on the OS is not displayed on the setting screen of the app.

As described above, according to the present embodiment, the smartphone 100 makes a request for the execution of the payment processing to a specific server (e.g., the server 200*a* for country C) associated with specific locale information that is currently set on the OS (e.g., locale information indicating country C) among a plurality of servers (the plurality of payment management servers 200). Furthermore, the smartphone 100 stores specific locale information that has been set when making a request for the execution of the payment processing in association with the app that operates on the OS (on the information processing apparatus). The locale information is stored in association with the app by, for example, storing the locale information inside the app as a user setting. Thereafter, at a certain timing, the smartphone 100 identifies the specific server that executed the payment processing by identifying a server associated with the locale information that has been stored in association with the app. The certain timing is, for example, a timing of detection of passing of the expiration date of the subscription contract obtained at the time of the payment processing. The smartphone 100 obtains the payment registration information including information indicating the latest expiration date of the subscription contract from the specific server that has been identified.

Therefore, according to the present embodiment, even in a case where the locale information on the OS has been changed after the payment processing, the smartphone 100 can identify the payment management server 200 that executed the payment processing and confirm the payment status.

Note that the locale information that is referenced by the smartphone 100 when making a request for the execution of the payment processing is not limited to the specific locale information that is currently set on the OS. For example, it is permissible to adopt a configuration in which the app includes setting items for locale information, and the smartphone 100 makes a request for the execution of the payment processing to the payment management server 200 associated with specific locale information that is currently set on the app. In this case, the above-described locale information stored inside the app (the locale information stored in association with the app) is stored as information that is distinguished from the locale information that is referenced when making a request for the execution of the payment processing.

Furthermore, in the above description, it is assumed that the locale information that has been read in in step S404, that is to say, the locale information that has been set when requesting the payment management server 200 to execute the payment processing, is stored in step S407. However, the information stored here may be any information as long as it is information (server identification information) for identifying a server that executed the payment processing (and therefore manages the payment status). For example, it is permissible to adopt a configuration in which a URL of the payment management server 200 associated with the locale information that has been read in in step S404 is stored as the server identification information.

Furthermore, in the above description, it is assumed that a contract for use of the app is the subscription contract. In other words, in the above description, the payment processing includes processing for starting the subscription contract. However, the contract for use of the app is not limited to the subscription contract. For example, it is permissible to adopt a configuration in which, once the usage fee of the app has been paid, the user can use the app permanently. In this case, the payment registration information includes information indicating whether the usage fee has already been paid.

Furthermore, processing that is requested by the smartphone 100 to be executed by a specific server associated with the locale information is not limited to the payment processing. Similarly, information that the smartphone 100 obtains from a specific server identified by server identification information is not limited to the payment registration information. The present embodiment includes a configuration in which the smartphone 100 requests a specific server to execute predetermined processing, stores server identification information for identifying this server, and then obtains predetermined information derived from the predetermined processing from the server identified by the server identification information. The above-described "payment processing" and "payment registration information" are respectively the examples of the "predetermined processing" and "predetermined information derived from the predetermined processing" mentioned earlier. As another example, the "payment processing" may be processing for storing image data held in the smartphone 100 into a server. In this case, the "predetermined information derived from the predetermined processing" may be the image data stored in the server.

Therefore, the present embodiment can reduce the possibility of causing problems attributed to a change in locale information in a configuration that allows the locale information to be changed after requesting the execution of the predetermined processing (e.g., the payment processing) to a server associated with the locale information that is currently set.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-068470, filed Apr. 18, 2022, which is hereby incorporated by reference herein in its entirety.

What is claimed is:

1. An information processing apparatus, comprising:

at least one memory storing instructions; and at least one processor that, upon executing the stored instructions, functions as a request unit configured to request a specific server among a plurality of servers to execute predetermined processing, the specific server being associated with specific locale information that is currently set on an operating system;

a storage unit configured to store server identification information that identifies the specific server associated with the specific locale information currently set on the operating system; and an obtainment unit configured to identify the specific server based on the server identification information stored in the storage unit, and obtain predetermined information derived from the predetermined processing from the specific server that has been identified based on the specific locale information stored in the storage unit, whereby the predetermined processing is performed by the specific server identified based on the specific locale information stored in the storage unit even if the specific locale information that is currently set on the operating system has changed.

2. The information processing apparatus according to claim 1, wherein the predetermined processing includes payment processing for a usage fee of a predetermined application that operates on the information processing apparatus.

3. The information processing apparatus according to claim 2, wherein the predetermined information derived from the predetermined processing includes information indicating whether the usage fee has already been paid.

4. The information processing apparatus according to claim 1, wherein the predetermined processing includes processing for starting a subscription contract for using a predetermined application that operates on the information processing apparatus, the subscription contract being accompanied by an expiration date that is automatically updated, and the predetermined information derived from the predetermined processing includes information indicating a latest expiration date of the subscription contract.

5. The information processing apparatus according to claim 4, wherein in response to detecting that the latest expiration date included in the obtained predetermined information has passed, the obtainment unit obtains the predetermined information from the specific server again.

6. The information processing apparatus according to claim 2, wherein the storage unit stores, as the server identification information, the specific locale information that has been set when the specific server is requested to execute the predetermined processing, the obtainment unit identifies the specific server by identifying, from among the plurality of servers, a server associated with the specific locale information that has been stored as the server identification information, and the information processing apparatus further comprises a display unit configured to display, on a user interface of the predetermined application, the specific locale information that has been stored as the server identification information.

7. The information processing apparatus according to claim 1, wherein the storage unit stores, as the server identification information, the specific locale information that has been set when the specific server is requested to execute the predetermined processing, and the obtainment unit identifies the specific server by identifying, from among the plurality of servers, a server associated with the specific locale information that has been stored as the server identification information.

8. The information processing apparatus according to claim 1, further comprising a change unit configured to change a setting of locale information on an operating system (OS) of the information processing apparatus.

9. The information processing apparatus according to claim 1, further comprising a change unit configured to change a setting of locale information on an operating system (OS) of the information processing apparatus, wherein the predetermined processing includes processing related to a predetermined application that operates on the OS, and the storage unit stores the server identification information in association with the predetermined application.

10. An information processing method executed by an information processing apparatus, comprising:

requesting a specific server among a plurality of servers to execute predetermined processing, the specific server being associated with specific locale information that is currently set on an operating system;

storing server identification information that identifies the specific server associated with the specific locale information currently set on the operating system; and identifying the specific server based on the server identification information stored in the storing, and obtaining predetermined information derived from the predetermined processing from the specific server that has been identified based on the specific locale information stored in the storing, whereby the predetermined processing is performed by the specific server identified based on the specific locale information stored in the storing even if the specific locale information that is currently set on the operating system has changed.

11. A non-transitory computer-readable storage medium which stores a program for causing a computer to execute an information processing method comprising:

requesting a specific server among a plurality of servers to execute predetermined processing, the specific server being associated with specific locale information that is currently set on an operating system;

storing server identification information that identifies the specific server associated with the specific locale information currently set on the operating system; and identifying the specific server based on the server identification information stored in the storing, and obtaining predetermined information derived from the predetermined processing from the specific server that has been identified based on the specific locale information stored in the storing, whereby the predetermined processing is performed by the specific server identified based on the specific locale information stored in the storing even if the specific locale information that is currently set on the operating system has changed.

12. A non-transitory computer-readable storage medium which stores a program as an application that operates on an operating system (OS), wherein the program, when executed by a processor of an information processing apparatus, causes the processor to perform:

obtaining specific locale information that is currently set on the OS;

requesting a specific server among a plurality of servers to execute predetermined processing, the specific server being associated with the specific locale information set on the operating system;

storing server identification information that identifies the specific server associated with the specific locale information currently set on the operating system; and identifying the specific server based on the server identification information stored in the storing, and obtaining predetermined information derived from the predetermined processing from the specific server that has been identified based on the specific locale information stored in the storing, whereby the predetermined processing is performed by the specific server identified based on the specific locale information stored in the storing even if the specific locale information that is currently set on the operating system has changed.

13. An information processing apparatus, comprising:

at least one memory storing instructions and storing information associating a plurality of servers with respective locale information; and at least one processor that, upon executing the stored instructions, functions as a request unit configured to request a first server among the plurality of servers to execute a first type of predetermined processing, the first server being associated with first locale information;

a storage unit configured to store, in the at least one memory, the first locale information;

a user interface configured to accept a user request;

a determination unit configured to determine whether an accepted user request relates to the first type of predetermined processing or a second type of predetermined processing;

an obtainment unit configured to obtain locale information in accordance with the determination by the determination unit, identify one of the plurality of servers that is associated with the obtained locale information, and request processing by the identified one of the plurality of servers, wherein in a case that the determination unit determines that the accepted user request relates to the first type of predetermined processing, the obtainment unit obtains second locale information that is currently set in the operating system (OS) of the information processing apparatus, identifies a second server associated with the second locale information, and requests the second processor to perform the first type of predetermined processing, and in a case that the determination unit determines that the accepted user request relates to the second type of predetermined processing, the obtainment unit obtains the first locale information from the at least one memory, identifies the first processor based on the first locale information, and requests the first server to perform the second type of predetermined processing.

* * * * *